(12) United States Patent
Bove et al.

(10) Patent No.: US 11,518,277 B2
(45) Date of Patent: Dec. 6, 2022

(54) BODY SCAN MEASUREMENT FOR PERSONALIZED ERGONOMIC VEHICLE SETTINGS

(71) Applicant: Volvo Car Corporation, Gothenburg (SE)

(72) Inventors: Thomas Bove, Copenhagen (DK); Christian Hedegaard, Hillerød (DK)

(73) Assignee: Volvo Car Corporation, Gothenburg (SE)

( * ) Notice: Subject to any disclaimer, the term of this patent is extended or adjusted under 35 U.S.C. 154(b) by 113 days.

(21) Appl. No.: 16/537,134

(22) Filed: Aug. 9, 2019

(65) Prior Publication Data

US 2021/0039522 A1    Feb. 11, 2021

(51) Int. Cl.
  *B60N 2/02* (2006.01)
  *B60R 16/037* (2006.01)
  *B60W 40/08* (2012.01)

(52) U.S. Cl.
  CPC .......... *B60N 2/0244* (2013.01); *B60R 16/037* (2013.01); *B60W 40/08* (2013.01); *B60W 2040/0872* (2013.01)

(58) Field of Classification Search
  CPC .... B60N 2/0244; B60R 16/037; B60W 40/08; B60W 2040/0872
  See application file for complete search history.

(56) References Cited

U.S. PATENT DOCUMENTS

| | | | |
|---|---|---|---|
| 6,573,673 B1* | 6/2003 | Hampel | B60N 2/0224 318/265 |
| 8,872,640 B2 | 10/2014 | Horseman | |
| 9,079,510 B2 | 7/2015 | Huber | |
| 9,707,912 B1* | 7/2017 | Pena Casimiro | B60Q 1/2665 |
| 10,850,693 B1* | 12/2020 | Pertsel | G06K 9/00832 |
| 2012/0053793 A1* | 3/2012 | Sala | B60N 2/002 701/45 |
| 2012/0086249 A1* | 4/2012 | Hotary | B60N 2/838 297/284.3 |
| 2014/0002252 A1* | 1/2014 | Fong | G02B 27/01 340/435 |
| 2015/0370253 A1* | 12/2015 | Gurin | B60W 50/085 701/1 |
| 2016/0055236 A1* | 2/2016 | Frank | G06Q 30/02 707/748 |

(Continued)

FOREIGN PATENT DOCUMENTS

| | | | | |
|---|---|---|---|---|
| DE | 102011113723 A1 | * | 3/2013 | ............. B60N 2/002 |
| DE | 102013212765 A1 | | 12/2014 | |

(Continued)

*Primary Examiner* — Peter D Nolan
*Assistant Examiner* — Demetra R Smith-Stewart
(74) *Attorney, Agent, or Firm* — Shumaker & Sieffert, P.A.

(57) ABSTRACT

Body measurements of a person may be scanned using a camera (e.g., a camera on a mobile phone. Vehicle settings may then be determined based on the body measurements. Example vehicle settings may include one or more of a position of a heads-up display, a position of a pedal, an angle of a backrest, a height of a seat cushion, a tilt of the seat cushion, an extension position of the seat cushion, a position of a lumbar support, a position of a seat side bolster, a position of a headrest, a position of a side mirror, a position of a rear-view mirror, a tilt of a steering wheel, and/or a position of a steering wheel.

20 Claims, 6 Drawing Sheets

(56) References Cited

U.S. PATENT DOCUMENTS

| | | | | |
|---|---|---|---|---|
| 2016/0332578 | A1* | 11/2016 | Wieczorek | B60R 1/02 |
| 2017/0045890 | A1* | 2/2017 | Gurin | H04N 7/181 |
| 2017/0305349 | A1* | 10/2017 | Naboulsi | B60R 1/025 |
| 2018/0310713 | A1* | 11/2018 | Hong | A47C 7/62 |
| 2019/0143997 | A1* | 5/2019 | Crimando | B60R 16/037 |
| | | | | 701/37 |
| 2019/0291608 | A1* | 9/2019 | Kong | B60N 2/181 |
| 2019/0329672 | A1* | 10/2019 | Brown | B60N 2/0232 |
| 2020/0202410 | A1* | 6/2020 | Edwards | G07C 5/008 |
| 2020/0398860 | A1* | 12/2020 | Singuru | B60W 30/09 |
| 2021/0166103 | A1* | 6/2021 | Jackson | G06Q 30/0631 |

FOREIGN PATENT DOCUMENTS

| | | |
|---|---|---|
| EP | 1261505 B1 | 1/2008 |
| EP | 3251889 B1 | 12/2017 |

* cited by examiner

BODY SCAN MEASUREMENT FOR PERSONALIZED ERGONOMIC VEHICLE SETTINGS

TECHNICAL FIELD

This disclosure relates to vehicles and, more specifically, adjusting operational and seating settings of a vehicle.

BACKGROUND

Vehicles include a variety of seating and other operational settings that are designed to accommodate drivers and passengers of various sizes. Adjusting such seating and operational settings allows drivers and passengers to operate the vehicle in a comfortable and safe manner. Incorrect and/or sub-optimal seating and operational settings may lead to unsafe driving conditions and/or driver and passenger discomfort. According to one study by the British Chiropractic Association (BCA), 40% of people report that sitting down aggravates back or neck pain.

Today, it is up to the customer to manually adjust all customisable user settings to achieve what the customer understands is the optimal ergonomic and safe seating position. No or little guidance is provided to what safe. Research shows that customers find it difficult to get comfortable at the wheel of their car because they do not know how to adjust all of the available settings. In some examples, vehicle seats may be adjustable in many different angels and directions (e.g., 15-way adjustments or more) to accommodate different body shapes and user preferences. In addition, many vehicles include further operational settings for side-view mirror position, rear-view mirror angle, position of heads-up display, steering wheel tile and telescopic, and pedal position. Accordingly, optimally adjusting seating and operational settings is often difficult and time consuming.

SUMMARY

In general, this disclosure describes techniques of determining one or more ergonomic operational and/or seating vehicle settings. Example vehicle settings may include one or more of a position of a heads-up display, a position of a pedal, an angle of a backrest, a height of a seat cushion, a tilt of the seat cushion, an extension position of the seat cushion, a position of a lumbar support, a position of a seat side bolster, a position of a headrest, a position of a side mirror, a position of a rear-view mirror, a tilt of a steering wheel, and/or a position of a steering wheel. In accordance with techniques of this disclosure, a processing device may determine one or more ergonomic vehicle settings automatically from body measurements of a vehicle occupant (e.g., a driver or a passenger). To improve the speed, accuracy, and convenience of obtaining such body measurements, the body measurements are obtained using a camera or other sensor-based device.

In one example, the device is a mobile device (e.g., mobile phone) that is configured to determine body measurements of a vehicle through one or more images captured of the vehicle occupant. For example, the mobile device may use a camera and an application configured for augmented reality applications to determine the body measurements of the vehicle occupant. The mobile device, a cloud server, or a computing system on the vehicle may then determine ergonomic vehicle settings for the vehicle based on the body measurements.

In one example, aspects of the techniques are directed to an apparatus configured to determine vehicle settings, the apparatus comprising an interface configured to communicate with a device including a camera to obtain a plurality of body measurements of a person, wherein the plurality of body measurements was captured using the camera, and one or more processors configured to determine one or more vehicle settings of a vehicle based on the plurality of body measurements.

In another example, aspects of the techniques are directed to an apparatus configured to determine vehicle settings, the apparatus comprising means for obtaining a plurality of body measurements of a person, wherein the plurality of body measurements was captured using the camera, and means for determining one or more vehicle settings of a vehicle based on the plurality of body measurements.

In another example, aspects of the techniques are directed to a method for determining vehicle settings, the method comprising obtaining, from a device including a camera, a plurality of body measurements of a person, wherein the plurality of body measurements was captured using the camera, and determining one or more vehicle settings of a vehicle based on the plurality of body measurements.

In another example, aspects of the techniques are directed to a non-transitory computer-readable medium having stored thereon instructions that, when executed, cause one or more processors to obtain, from a device including a camera, a plurality of body measurements of a person, wherein the plurality of body measurements was captured using the camera, and determine one or more vehicle settings of a vehicle based on the plurality of body measurements.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
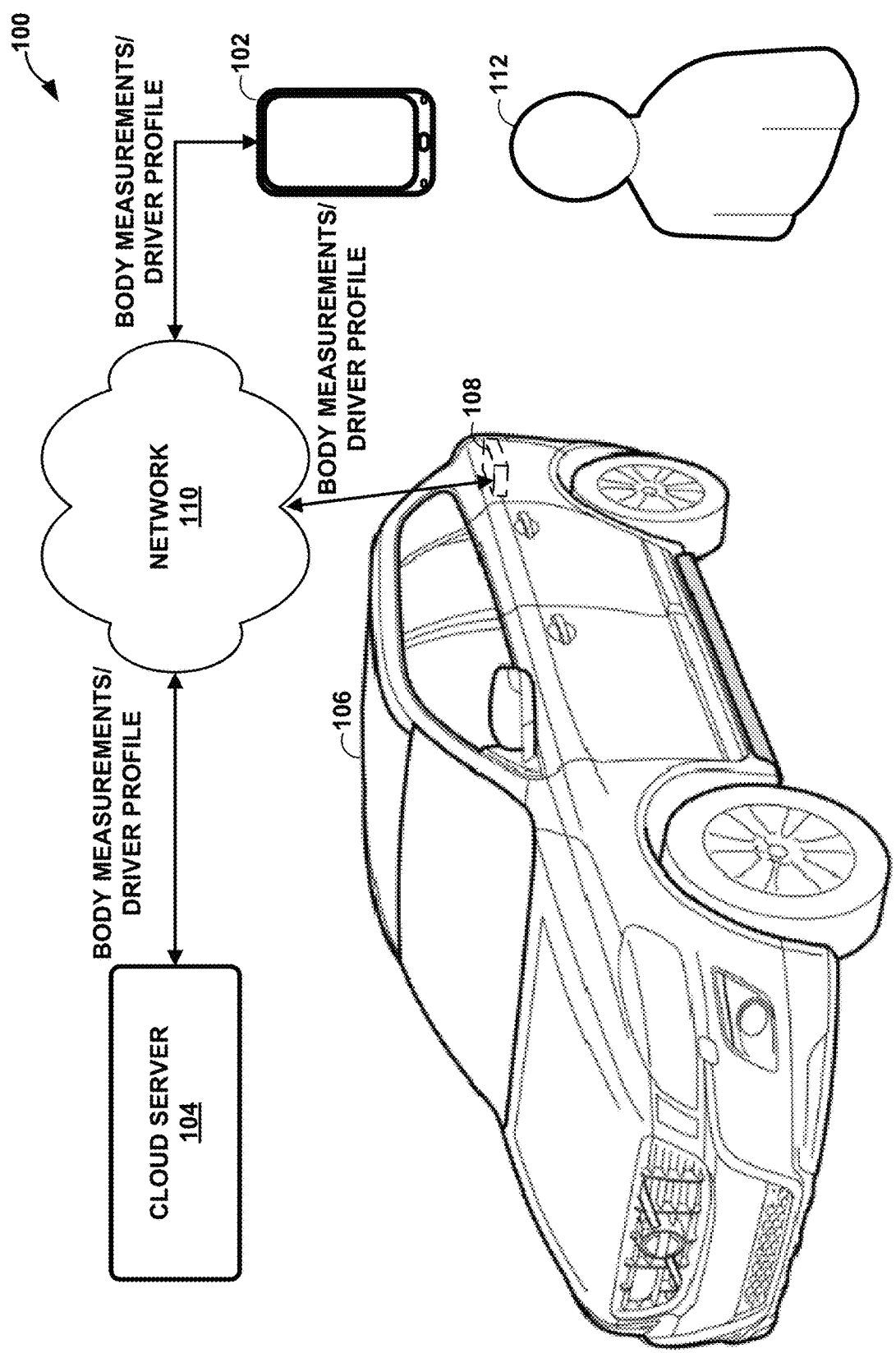
FIG. 1 is a diagram illustrating an example system configured to perform various aspects of the ergonomic vehicle settings techniques described in this disclosure.

FIG. 1 is a diagram illustrating an example system 100 configured to perform various techniques for determining ergonomic vehicle settings based on body measurements that are described in this disclosure. As shown in the example of FIG. 1, system 100 includes, a body measurement capture device 102, a cloud server 104, a vehicle 106, a network 110, and a vehicle occupant 112. As shown in FIG. 1, vehicle 106 includes a vehicle computing system 108 that may be configured to receive and/or determine ergonomic vehicle settings in accordance with the techniques of this disclosure. Vehicle computing system 108 is shown using dashed lines to denote that vehicle computing system 108 may not be visible or is otherwise integrated within vehicle 106. Vehicle occupant 112 may be either a driver of a passenger for vehicle 106. Vehicle 106 may be any type of automobile that has adjustable ergonomic vehicle settings, including settings for one or more of a position of a heads-up display, a position of a pedal, an angle of a backrest, a height of a seat cushion, a tilt of the seat cushion, an extension position of the seat cushion, a position of a lumbar support, a position of a seat side bolster, a position of a headrest, a position of a side mirror, a position of a rear-view mirror, a tilt of a steering wheel, and/or a position of a steering wheel.

Network 110 may represent any type of network by which communication between vehicle computing system 108 of vehicle 106 and cloud server 104 and/or a body measurement capture device 102 may be accomplished. Network 110 may represent a public network (e.g., the Internet), a private network, a cellular network (including various cellular data network, such as a 3G, 4G and/or 5G network), a personal area network, or combinations thereof.

Body measurement capture device 102 is a device including one or more sensors that is configured to determine the body measurements of vehicle occupant 112. Body measurement capture device 102 may be a mobile phone, laptop computer, tablet computer, desktop computer, or any other device that may be used to determine body measurements of a user from the output of a sensor. In one example, the sensor may be one or more cameras that are configured to capture one or more images of vehicle occupant 112. In other examples, body measurement capture device 102 may use different sensors or a plurality of sensors to capture body measurements of vehicle occupant 112. Example sensors may include lasers, sonar, radar, LiDAR, or other types of sensors.

To determine the body measurements of vehicle occupant 112, body measurement capture device 102 may perform a body scan by capturing one or more images of vehicle occupant 112. In some examples, rather than capturing images, body measurement capture device 102 may retrieve previously stored images. The images may be 2D images, taken from a regular camera on mobile, desktop, etc., or 3D depth images, taken from a 3D depth sensing camera.

In one example, the image(s) may include the entire length of the body of vehicle occupant 112 in order to determine the dimensions of the body in 3D space. In some examples, the images may also include a predefined object used to determine scale. Examples of body measurements that may be determined and/or derived may include overall height, distance from waist to eyes (e.g., to determine a line of sight), overall arm length, distance from shoulder to elbow, distance from elbow to hand, overall leg length, distance from waist to knees, distance from knees to feet, shoulder width, waist width, waist circumference, and the like.

In one example, body measurement capture device 102 may determine key points and/or joints of vehicle occupant 112 from the captured image(s). The key points and/or joints may include the head, eyes, shoulders, elbows, wrists, hands, waistline, knees, ankles, or another other feature of the human body that may be useful in determining the dimensions of the body. In one example, body measurement capture device 102 may extract the key points and or joints of vehicle occupant 112 using image recognition techniques (e.g., deep neural networks). Body measurement capture device 102 may further extract depth information for the body of vehicle occupant 112, either from multiple images or a single image captured with depth information, to determine the dimensions of various body features (e.g., shoulder width, body circumference, etc.).

In some examples, rather than relying upon multiple 2D images to determine depth, it may be possible to retrieve depth information directly from body measurement capture device 102. For instance, some next generation mobile devices have 3D depth sending capabilities that may be used to determine physical measurements in the real-world for augmented reality applications. One example of such applications are augmented reality applications used to determine body measurements for fashion applications. In such cases, rather than extrapolating depth from one or more 2D images, body measurement capture device 102 can receive the 3D depth information along with the texture information of the image determine the body measurements. The above are just some examples of how body measurements may be quickly and accurately determined for vehicle occupant 112. However, it should be understood that the techniques of this disclosure are applicable for use with any sensor-based system for performing a 3D/2D body scan of a person and determining body measurements from the 3D/2D body scan.

As will be explained in more detail below, based on the body measurements captured by body measurement capture device 102, a processing system may determine ergonomic vehicle settings of vehicle 106 for vehicle occupant 112. The processing system that determines that ergonomic vehicle settings may be body measurement capture device 102, cloud server 104, and/or vehicle computing system 108. Using body measurements captured by a 3D/2D body scan allows multiple ergonomic vehicle settings to be determined quickly, with minimal to no user inputs. Also, by using accurate measurements of the body, a processing system may determine more accurate ergonomic vehicle settings for vehicle occupant 112, thus improving occupant comfort.

As described above, any number of devices may be configured to determine the ergonomic vehicle settings from the body measurements. In one example, body measurement capture device 102 itself may determine ergonomic vehicle settings for vehicle 106 from the captured body measurements. Examples of ergonomic vehicle settings will be discussed in more detail below. Body measurement capture device 102 may store the determined ergonomic vehicle settings in a driver (or passenger) profile that is associated with vehicle occupant 112 and the particular vehicle 106. Driver profile may be a data structure that stores information relating to particular vehicles and occupants. Body measurement capture device 102 may determine ergonomic vehicle settings for each of multiple seating positions. For example, the ergonomic vehicle settings may different for drivers, front seat passengers, and rear seat passages. Body measurement capture device 102 may be configured to send the ergonomic vehicle settings (e.g., in the driver profile) to cloud server 104 and/or vehicle computing system 108 through network 110.

In other examples, body measurement capture device 102 may only be configured to determine body measurements and may send the body measurements to cloud server 104 and/or vehicle computing system 108 through network 110. In this example, cloud server 104 and/or vehicle computing system 108 may be configured to determine the ergonomic vehicle settings from the body measurements. Cloud server 104 may be any type of server computer configured to send and receive information. In this example, cloud server 104 may be configured with a database that stores driver profiles, including ergonomic vehicle settings, for a plurality of vehicles 106. As mentioned above, in one example cloud server 104 may be configured to determine the ergonomic vehicle settings, and create the driver profile, from the body measurements received from body measurement capture device 102. In another example, body measurement capture device 102 may send the determined body measurements to vehicle computing system 108 of vehicle 106. In this example, vehicle computing system 108 may determine the ergonomic vehicle settings from the body measurements. Example structures for body measurement capture device 102, cloud server 104, and vehicle computing system 108 will be described in FIG. 2, FIG. 4, and FIG. 5, respectively.

In accordance with techniques of this disclosure, one or more of body capture measurement device 102, cloud server 104, and/or vehicle computing system 108 may include an interface configured to obtain a plurality of body measurements of a person, wherein the plurality of body measurements was captured using a camera. One or more of body capture measurement device 102, cloud server 104, and/or vehicle computing system 108 may further be configured to determine one or more vehicle settings of a vehicle based on the plurality of body measurements.

Figure 2:
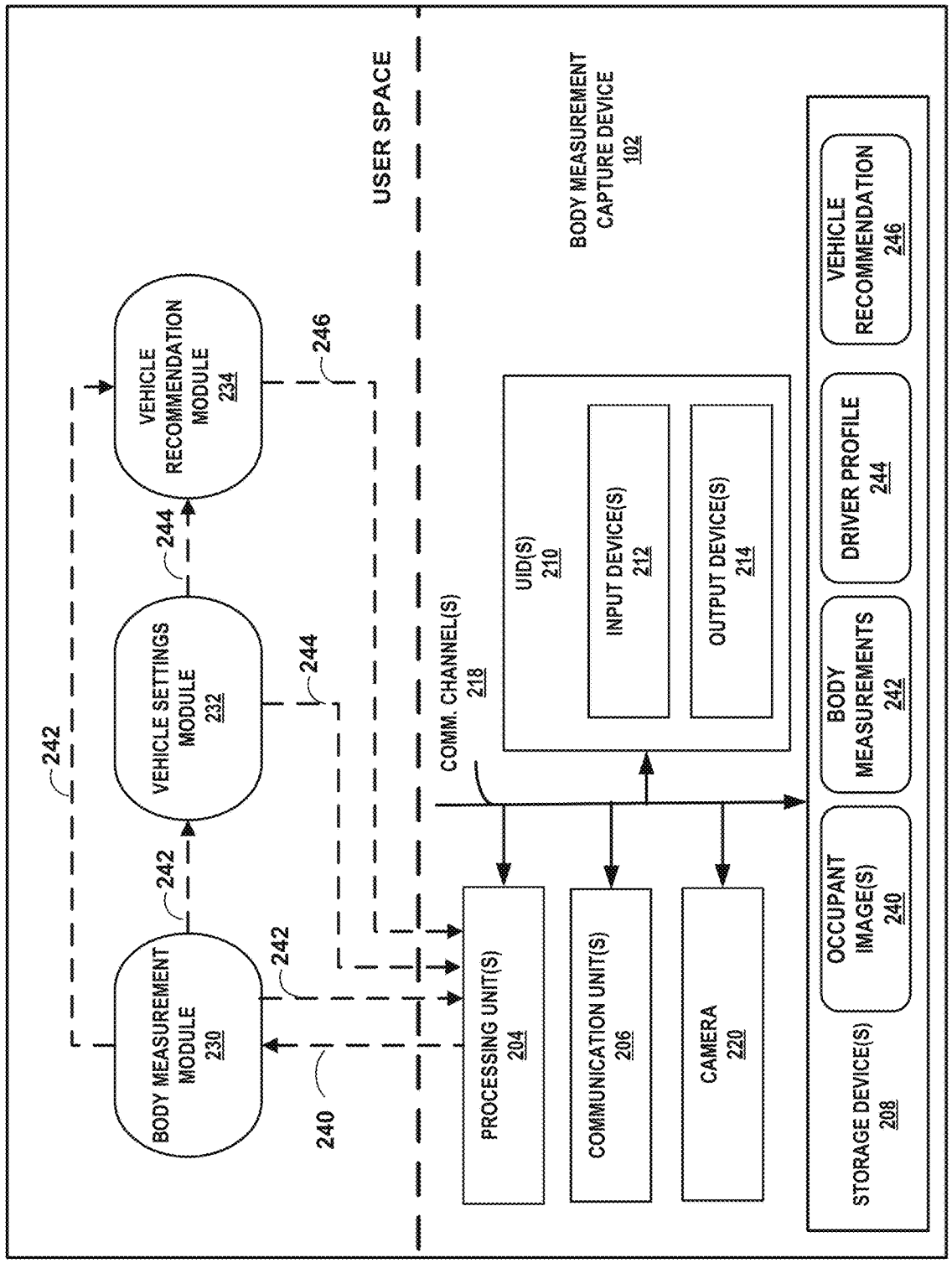
FIG. 2 is a block diagram illustrating an example body measurement capture device configured to perform various aspects described in this disclosure.

FIG. 2 is a block diagram illustrating an example body measurement capture device 102 configured to perform various aspects described in this disclosure. In FIG. 2, solid lines denote physical connections, while dashed lines represent software data flows. As described above, body measurement capture device 102 may be any type of computing device, including a mobile device, a mobile telephone, a tablet computer, a laptop computer, a desktop computer, or the like. In the example of FIG. 2, body measurement capture device 102 is a mobile phone. Body measurement capture device 102 may include one or more processing units 204, one or more communication units 206, one or more user interface devices (UIDs) 210, a camera 220, at least one communication channel 218, and one or more storage devices 208. FIG. 2 illustrates only one particular example of body measurement capture device 102, and many other examples of body measurement capture device 102 may be used in other instances and may include a subset of the components included in the example body measurement capture device 102 or may include additional components not shown in FIG. 2.

Processing units 204 may represent a unit implemented as fixed-function processing circuits, programmable processing circuits, or a combination thereof. Fixed-function circuits refer to circuits that provide particular functionality and are pre-set on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits. Accordingly, processing units 204 may be implemented in one or more of fixed function, programmable, or combinations thereof, such as microprocessors, digital signal processors (DSPs), application specific integrated circuits (ASICs), field programmable gate arrays (FPGAs), discrete logic, software, hardware, firmware or any combinations thereof. As will be described in more detail below, in the example of FIG. 2, processing units 204 may be configured to execute one or more user space software applications, including one or more of body measurement module 230, vehicle settings module 232, and/or vehicle recommendation module 234.

Communication units 206 may represent a unit and/or interface configured to communicate with one or more other computing devices by transmitting and/or receiving data. Communications units 206 may include wired and/or wireless communication units. Examples of wired communication units 206 include Universal Serial Bus (USB) transceivers. Examples of wireless communication units 206 include GPS radios, cellular (e.g., LTE) radios, Bluetooth™ radios, WiFi™ radios, or any other wireless radios.

In some examples, storage devices 208 may represent a unit (e.g., a memory) configured to store one or more software modules, such as body measurement module 230, vehicle settings module 232, and/or vehicle recommendation module 234. As will be discussed in more detail below, storage devices 208 may also store data that is used by or produced by the various software modules, including occupant image(s) 240, body measurements 242, driver profile 244, and vehicle recommendation 246. Storage devices 208 may include temporary memory, meaning that a primary purpose of some units of storage device 208 is not long-term storage. Storage device 208 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage device 208 may include one or more non-transitory computer-readable storage devices. Storage device 208 may be configured to store larger amounts of information than typically stored by volatile memory. Storage device 208 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage device 208 may store program instructions and/or information (e.g., data) that, when executed, cause processing unit 204 to perform the techniques of this disclosure.

User interface devices (UID) 210 may represent a unit configured to enable a user to interact with body measurement capture device 102. UIDs 210 may include one or more input devices 212 and/or more output devices 214. Examples of input devices 212 include display devices, keyboards, pointing devices (such as a mouse or digital pen), microphones, physical buttons or knobs, among others. Examples of output devices 214 include display devices and speakers, among others. Display devices may include touchscreens (e.g., capacitive or resistive). Example display devices include liquid crystal displays (LCD), light emitting diode (LED) displays, organic light-emitting diode (OLED) displays, e-ink, or other device configured to display information to a user.

Communication channels 218 may represent a unit configured to interconnect each of processing units 204, communication units 206, storage devices 208, UIDs 210, and/or camera 220 for inter-component communications (physically, communicatively, and/or operatively). In some examples, communication channels 218 may include a system bus, a network connection, one or more inter-process communication data structures, or any other components for communicating data.

Camera 220 may be any type of camera sensor and/or image processor configured to capture images. In some examples, camera 220 may be configured with a single camera sensor. In other examples, camera 220 may be configured with two or more camera sensors at different positions, such that multiple images may be captured at different angles. The images captured at different angles may be used to determine depth positions in an image and identify locations of objects in the captured image in 3D space. In other examples, camera 220 may be a depth-enabled camera sensor. Example camera systems or sensor types that provide depth information may include time-of-flight (TOF) cameras. A TOF camera is a camera sensors that uses a laser to determine the distance between the camera and objects within an image that is being captured.

In accordance with the techniques of this disclosure, camera 220 may capture one or more occupant image(s) 240 of vehicle occupant 112 (FIG. 1). Camera 220 may be configured to store occupant image(s) 240 in a memory, such as storage device(s) 208. Body measurement capture device 102 may be configured to use occupant image(s) 240 to determine body measurements of a user (e.g., vehicle occupant 112 of FIG. 1).

To determine the body measurements, processing units 204 may be configured to execute body measurement module 230. Body measurement module 230 may receive occupant image(s) 240 as an input. As described above, techniques of this disclosure include using augmented reality technology (AR) or other image processing techniques to perform a body scan in order to measure the body of vehicle occupant 112.

In one example, occupant image(s) 240 may include the entire length of the body of vehicle occupant 112 in order to determine the dimensions of the body in 3D space. In some examples, occupant image(s) 240 may also include a predefined object used to determine scale. Examples of body measurements that may be determined and/or derived may include overall height, distance from waist to eyes (e.g., to determine a line of sight), overall arm length, distance from shoulder to elbow, distance from elbow to hand, overall leg length, distance from waist to knees, distance from knees to feet, shoulder width, waist width, waist circumference, and the like.

In one example, body measurement module 230 may determine key points and/or joints of vehicle occupant 112 from occupant image(s) 240. The key points and/or joints may include the head, eyes, shoulders, elbows, wrists, hands, waistline, knees, ankles, or another other feature of the human body that may be useful in determining the dimensions of the body. In one example, body measurement module 230 may extract the key points and or joints of vehicle occupant 112 using image recognition techniques (e.g., deep neural networks). Body measurement module 230 may further extract depth information for the body of vehicle occupant 112, either from multiple images or a single image of occupant image(s) 240 captured with depth information, to determine the dimensions of various body features (e.g., shoulder width, body circumference, etc.). Once the body measurements are determined, body measurement module 230 may store body measurements 242 in storage device 208.

Figure 3:
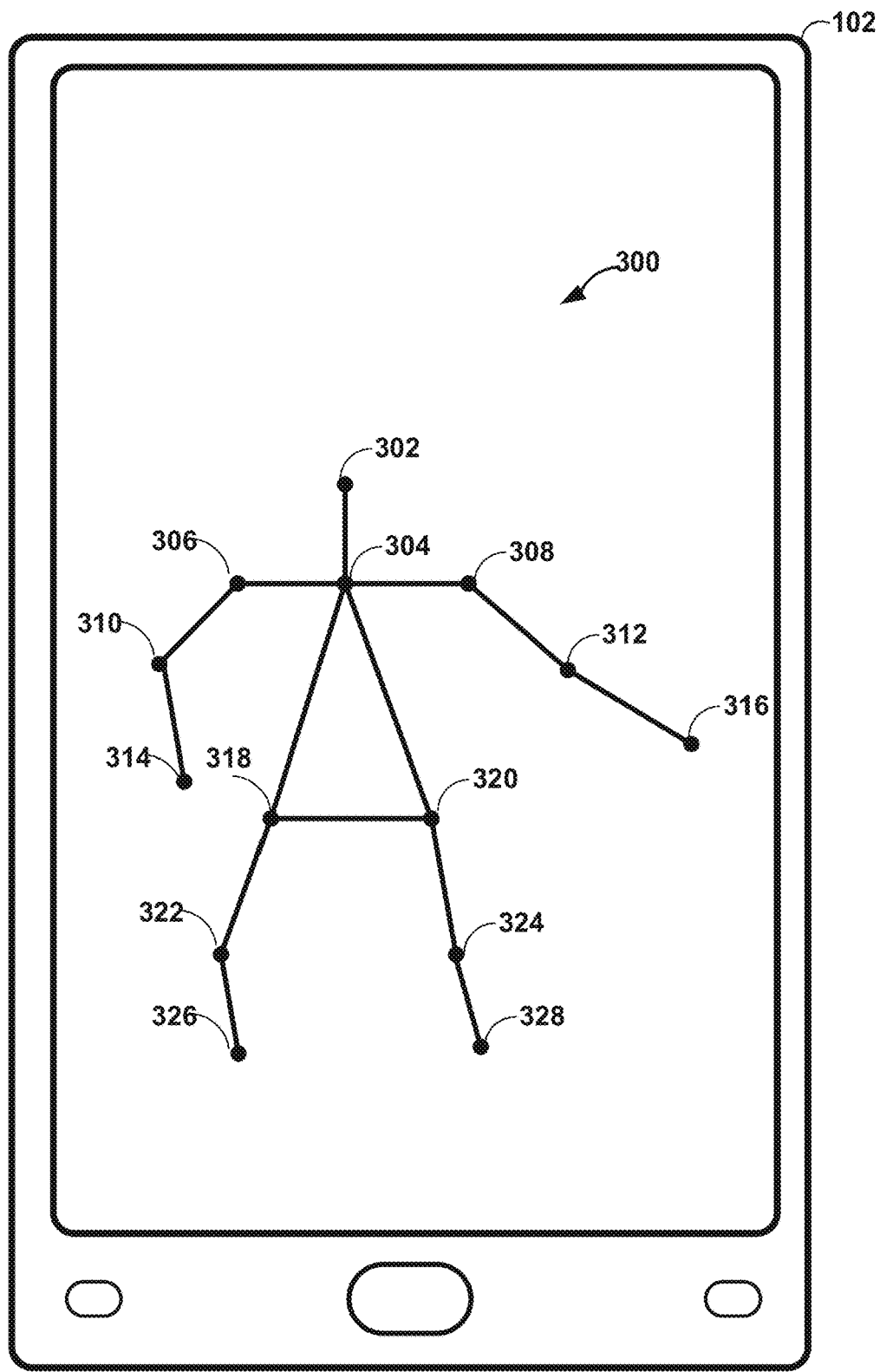
FIG. 3 is a diagram illustrating an example user interface of the body measurement capture device of FIG. 2.

FIG. 3 is a diagram illustrating an example user interface of the body measurement capture device of FIG. 2. As described above, body measurement capture device 102 may be configured to determine a plurality of key points of the body of vehicle occupant 112 to determine body dimensions. FIG. 3 shows an example of a user interface 300 that may show the body of vehicle occupant 112 labelled with various key points. The key points shown in FIG. 3 are just one example. In other examples more or fewer key points may be identified.

In one example, body measurement module 230 may identify a head key point 302 (including the position of the eyes), base of neck key point 304, should key points 306 and 308, elbow key points 310 and 312, wrist key points 314 and 26, waist key points 318 and 320, knee key points 322 and 324, and ankle key points 326 and 326. From these key points, body measurement module 230 may determine various body dimensions. For example, body measurement module 230 may be configured to determine the leg length from knee to ankle and the overall leg length, the arm length from elbow to wrist and the overall arm length, the torso length (e.g., waist to shoulders) and overall height, eye position, head position, line-of-sight, curve of the back, torso width, width at the waist, and width at the shoulders. In other examples, more or fewer measurements may be determined.

Returning to FIG. 2, in some examples, body measurement capture device 102 may be configured to send (e.g., through communication unit(s) 206), body measurements 242 to one or more of cloud server 104 and/or vehicle computing system 108 (see FIG. 2). Cloud server 104 and/or vehicle computing system 108 may then use body measurements 242 to determine ergonomic vehicle settings for vehicle 106 (FIG. 1). In other examples, body measurement capture device 102 may determine the ergonomic vehicle settings itself. In this example, body measurement module 230 may be configured to send body measurements 242 to vehicle settings module 232.

Processing units 204 may be configured to execute vehicle setting module 232 to determine vehicle settings for vehicle 106 (FIG. 1) based on body measurements 242. Based on the body measurements 242, vehicle setting module 232 may determine one or more vehicle settings for vehicle occupant 112 (FIG. 1). Examples of settings may include settings seats, steering wheel, heads-up display (HUD), rear-view mirrors, side view mirrors, pedals, and the like. Vehicle settings module 232 may be configured to store the vehicle settings in driver profile 244.

In one example of the disclosure, based on the body measurements 242 (including the leg length from knee to ankle and the overall leg length), vehicle settings module 232 may generate vehicle settings for the seats and/or pedals of vehicle 112 such that the distance from the seat to the pedals is adjusted so that the knee of vehicle occupant 112 is slightly bent when the pedals are fully depressed.

In another example of the disclosure, based on the body measurements 242 (including the arm length from elbow to wrist and the overall arm length), vehicle settings module 232 may generate vehicle settings for the tilt of the seat backrest and/or steering wheel telescope adjustment such that the steering wheel is easy to reach with slightly bent elbows. In addition, vehicle settings module 232 may generate vehicle settings for the tilt of the seat backrest and/or steering wheel telescope adjustment such that shoulder contact is maintained with the seat backrest when the steering wheel is turned.

In another example of the disclosure, based on the body measurements 242 (including the torso length and overall height), vehicle settings module 232 may generate vehicle settings for the seat height such that the seat is set as high as possible to ensure an unobstructed view to all sides and all displays on the instrument panel.

In another example of the disclosure, based on the body measurements 242 (including the torso length, overall height, and eye position), vehicle settings module 232 may generate vehicle settings for the projection location of the HUD such that the HUD is display in the line-of-sight of vehicle occupant 112.

In another example of the disclosure, based on the body measurements 242 (including the leg length from knee to ankle and the overall leg length), vehicle settings module 232 may generate vehicle settings for the tilt of the seat cushion and/or the position of the pedals such that it is easy to fully depress the pedals while ensuring the thighs of vehicle occupant 112 can rest gently on the seat cushion without exerting an undesirable amount of pressure on the seat cushion.

In another example of the disclosure, based on the body measurements 242 (including the leg length from knee to ankle and the overall leg length), vehicle settings module 232 may generate vehicle settings for an extendable seat cushion such that the thighs of vehicle occupant 112 rest on the seat cushion to just above the knee. In one example, vehicle settings module 232 may generate vehicle settings for the extendable seat cushion such that there is 3-5 inches of clearance between the seat edge and the hollow of the knee.

In another example of the disclosure, based on the body measurements 242 (including the curve of the back), vehicle settings module 232 may generate vehicle settings for the lumbar support such that the lumbar support is adjusted so the lumbar part of the back is supported in its natural shape.

In another example of the disclosure, based on the body measurements 242 (including the torso width), vehicle settings module 232 may generate vehicle settings for the adjustable side bolsters of the seat such that side bolsters are adjusted to fit snugly to the body. In this example, vehicle settings module 232 may further generate vehicle settings for the adjustable side bolsters of the seat such that the upper body is supported comfortably at the side without being restricted.

In another example of the disclosure, based on the body measurements 242 (including the torso length, overall height, and eye position), vehicle settings module 232 may generate vehicle settings for the seat headrest such that the headrest is adjusted to the same height as the top of the head. In one example, the distance to the head should be approximately 2 cm.

In another example of the disclosure, based on the body measurements 242 (including the torso length, overall height, and eye position), vehicle settings module 232 may generate vehicle settings for the position of the side mirrors such that the side mirrors are adjusted to fit the line-of-sight of vehicle occupant 112.

In another example of the disclosure, based on the body measurements 242 (including the torso length, overall height, and eye position), vehicle settings module 232 may generate vehicle settings for the position of the rear-view mirror such that the rear-view mirror is adjusted to fit the line-of-sight of vehicle occupant 112.

Vehicle settings module 232 may be configured to generate each of the example vehicle settings above individually. In other examples, vehicle settings module 232 may be configured to generate to any combination of the vehicle settings described above, including all of the vehicle settings. In some examples, vehicle settings module 232 may be configured to generate vehicle settings for seats only. In other examples, vehicle settings module 232 may be configured to generate vehicle settings for mirrors only. In still other examples, vehicle settings module 232 may be configured to generate vehicle settings for both seats and mirrors.

Vehicle settings module 232 may save the generated vehicle settings for vehicle occupant 112 in a unique driver profile 244. In some examples, body measurement capture device 102 may send driver profile 244 to cloud server 104. Cloud server may then synchronize driver profile 244 with any vehicle that vehicle occupant 112 is authorized to use. A computing system on such a vehicle may then cause the vehicle settings in driver profile 244 to be implemented. As one example, cloud server 104 may send driver profile 244 to vehicle computing system 108 of vehicle 106. In other examples, body measurement capture device 102 may be configured to send driver profile 244 directly to vehicle computing system 108 of vehicle 106. As such, in some examples, cloud server 104 is not needed.

In other examples, rather than storing a single set of vehicle settings in driver profile 244, vehicle settings module 232 may be configured to generate multiple configurations of vehicle settings for driver profile 244. For example, vehicle settings module 232 may generate a configuration of vehicle settings for each of the seats in vehicle 106 based on body measurements 242. Each of the seats in vehicle 106 may have different levels of adjustability. In addition, some seats may not require driver-centric settings (e.g., settings for driver line-of-site).

Furthermore, it may be expected that many passengers may like to have some variation of seating, for example, during long trips. Other drivers may prefer a more upright seating position for heavy traffic situations. Accordingly, in some examples, vehicle settings module 232 may generate multiple configurations for each seating position, including a relaxed seating configuration that may include more seat back tilt and an upright seating configuration that may include less seat back tilt.

In other examples of the disclosure, rather than using body measurements 242 to determine vehicle settings for a particular vehicle, body measurement capture device 102 may be configured to determine a particular vehicle from a plurality of vehicles that best suits the body dimensions of vehicle occupant 112. Such a technique may be useful in a car buying, leasing, or renting scenario. In this example, processing units 204 may execute a vehicle recommendation module 234 to determine a vehicle recommendation 246 for vehicle occupant 112. Vehicle recommendation module 234 may determine vehicle recommendation 246 based on one or more of body measurements 242 or from determined vehicle settings in driver profile 244. Vehicle recommendation module 234 may determine vehicle recommendation 246 for a driver, a front seat passenger, or a rear seat passenger. For example, some people might not fit into the back seats (which can often not be adjusted) of certain vehicles. Vehicle recommendation module 234 may provide vehicle recommendation 246 to indicate which vehicles provide a comfortable fit, thus avoiding situations of buying, leasing, or renting uncomfortable vehicles.

Figure 4:
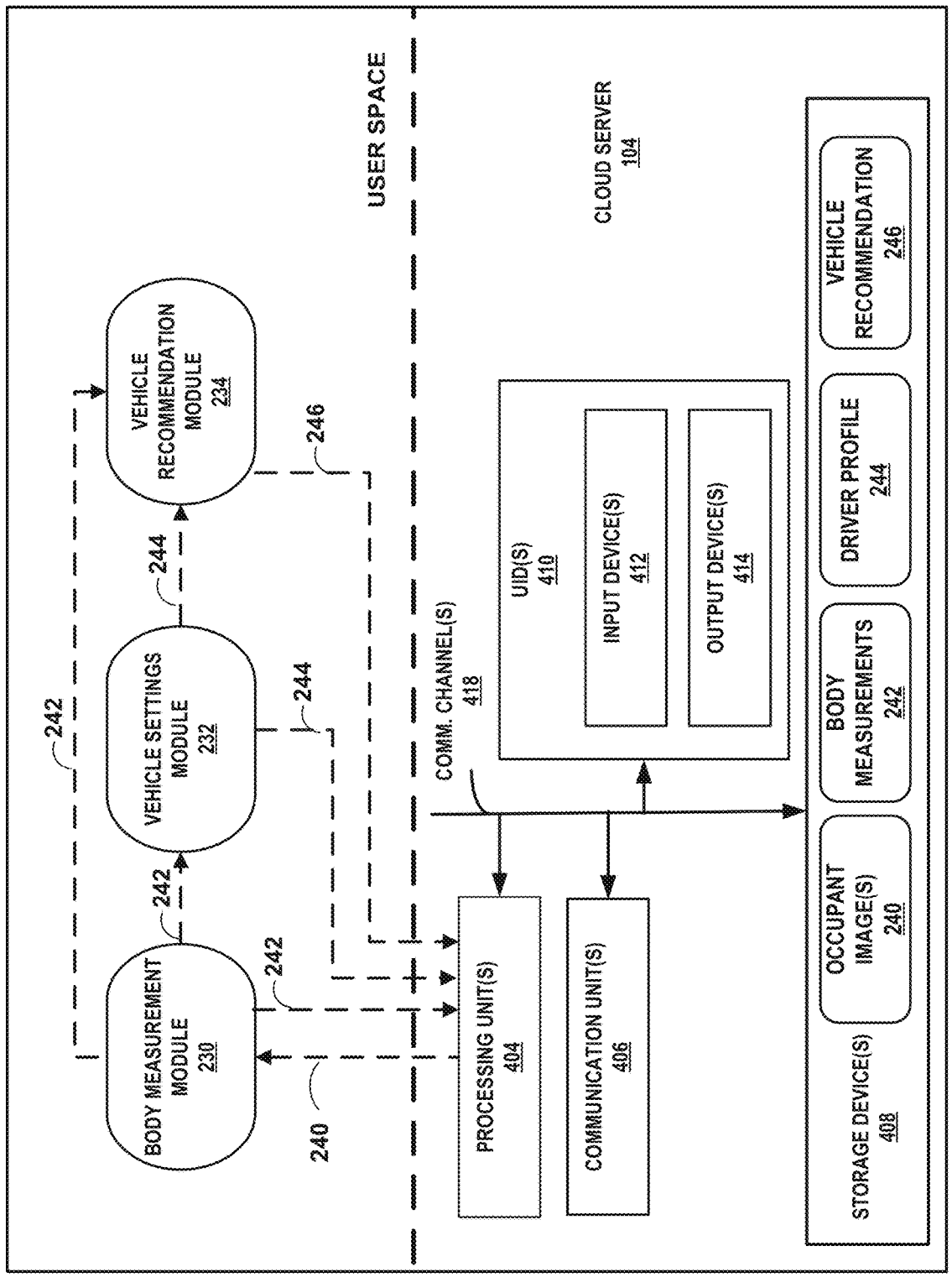
FIG. 4 is a block diagram illustrating an example cloud server configured to perform various aspects described in this disclosure.

FIG. 4 is a block diagram illustrating an example of cloud server 104 that is configured to perform various aspects described in this disclosure. In FIG. 4, solid lines denote physical connections, while dashed lines represent software data flows. Cloud server 104 may include processing units 404, communications units 406, communication channels 418, UIDs 410 (including input devices 412 and output devices 414), and storage devices 408. Each of these structures of cloud server 104 may be the same type of structures as processing units 204, communications units 206, communication channels 218, UIDs 210 (including input devices 212 and output devices 214), and storage devices 208 of body measurement capture device 102 of FIG. 2.

Like body measurement capture device 102, in some examples, processing units 404 may be configured to execute one or more of body measurement module 230, vehicle settings module 232, and/or vehicle recommendation modules 234. The only difference from body measurement capture device 102 is the source of the input data and where output data is sent.

In one example, body measurement capture device 102 is configured to capture occupant images 240, determine body measurements 242, and send body measurements 242 to cloud server 104. In this example, cloud server 104 receives body measurements 242 and may execute vehicle settings module 232 to determine vehicle settings to store in driver profile 244 in the manner described above. Cloud server 104 may then send driver profile 244 to vehicle computing system 108 so that vehicle computing system 108 may implement the determined vehicle settings. Cloud server 104 may also be configured to execute vehicle recommendation module 234 in the manner described above.

In another example, body measurement capture device 102 is configured to capture occupant images 240 and send occupant images 240 to cloud server 104. In this example, cloud server 104 is configured to execute body measurement module 230 to determine body measurements 242. Cloud server 104 may then execute vehicle settings module 232 to determine vehicle settings to store in driver profile 244 in the manner described above. Cloud server 104 may then send driver profile 244 to vehicle computing system 108 so that vehicle computing system 108 may implement the determined vehicle settings.

In still another example, body measurement capture device 102 is configured to capture occupant images 240, determine body measurements 242, determine vehicle settings and store them in driver profile 244, and send driver profile 244 to cloud server 104. In this example, cloud server 104 is only configured to store driver profile 244 and synchronize driver profile 244 with vehicle 106 when requested.

Figure 5:
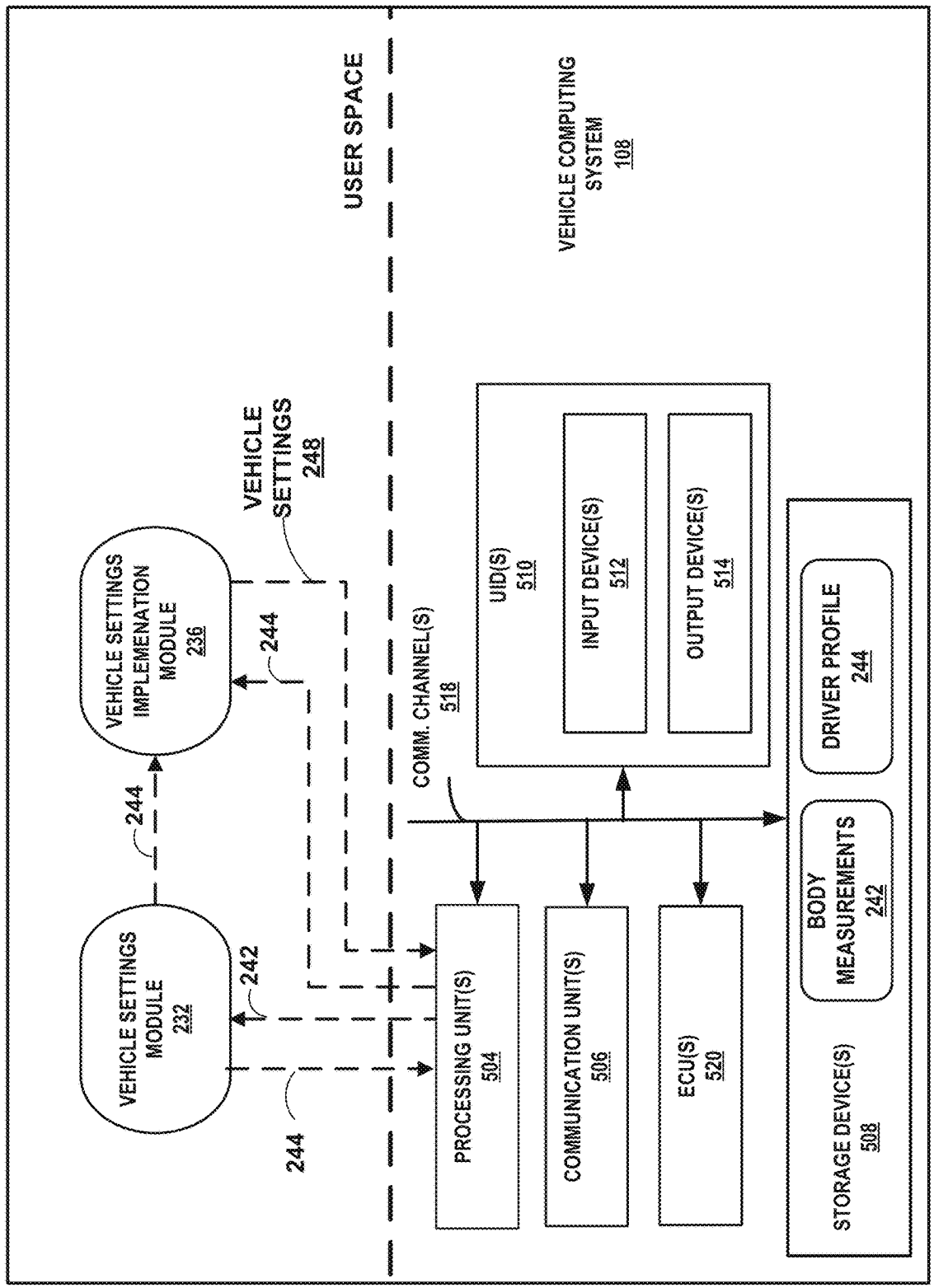
FIG. 5 is a block diagram illustrating an example vehicle computing system configured to perform various aspects described in this disclosure.

FIG. 5 is a block diagram illustrating an example of vehicle computing system 108 that is configured to perform various aspects described in this disclosure. In FIG. 5, solid lines denote physical connections, while dashed lines represent software data flows. Vehicle computing system 108 may include processing units 504, communications units 506, communication channels 518, UIDs 510 (including input devices 512 and output devices 514), and storage devices 508. Each of these structures of vehicle computing system 108 may be the same type of structures as processing units 204, communications units 206, communication channels 218, UIDs 210 (including input devices 212 and output devices 214), and storage devices 208 of body measurement capture device 102 of FIG. 2.

Like body measurement capture device 102, in some examples, processing units 504 may be configured to execute vehicle settings module 232. Though not picture, vehicle computing system 108 may also be configured to receive occupant images 240 and execute body measurement module 230.

In one example, body measurement capture device 102 is configured to capture occupant images 240. One of body measurement capture device 102 or cloud server 104 is configured to determine body measurements 242 and send body measurements 242 to vehicle computing system 108. In this example, vehicle computing system 108 receives body measurements 242 and may execute vehicle settings module 232 to determine vehicle settings to store in driver profile 244 in the manner described above. In another example, body measurement capture device 102 and/or cloud server 104 is configured to send driver profile 244 to vehicle computing system 108.

Regardless of how driver profile 244 is obtained, processing units 504 may be further configured to execute vehicle settings module 236. Vehicle settings module 236 may read driver profile 244, determine vehicle settings 248 from driver profile 244, and send instructions to one or more electronic control units (ECUs) 520 to cause vehicle 106 to implement vehicle settings 248. This may include instructions that cause one or more motors of an adjustable seat, adjustable steering wheel, adjustable mirrors, or adjustable display to cause the seat, mirrors, pedals, steering wheels, and displays to move into the arrangement specified by vehicle settings 248.

ECUs 520 may include a microcontroller, and memory (such as one or more of static random-access memory—SRAM, electrically erasable programmable read-only memory—EEPROM, and Flash memory), digital and/or analog inputs, digital and/or analog outputs (such as relay drivers, H bridge drivers, injector drivers, and logic outputs). ECUs 520 may represent one or more electronic control units configured to control electronics and various subsystems of vehicle 106, such as the above noted seats, mirrors, pedals, steering wheels and display. ECUs 520 may each be implemented as an embedded system, which may include a microcontroller or other type of processor, memory, inputs, and outputs as noted above.

Figure 6:
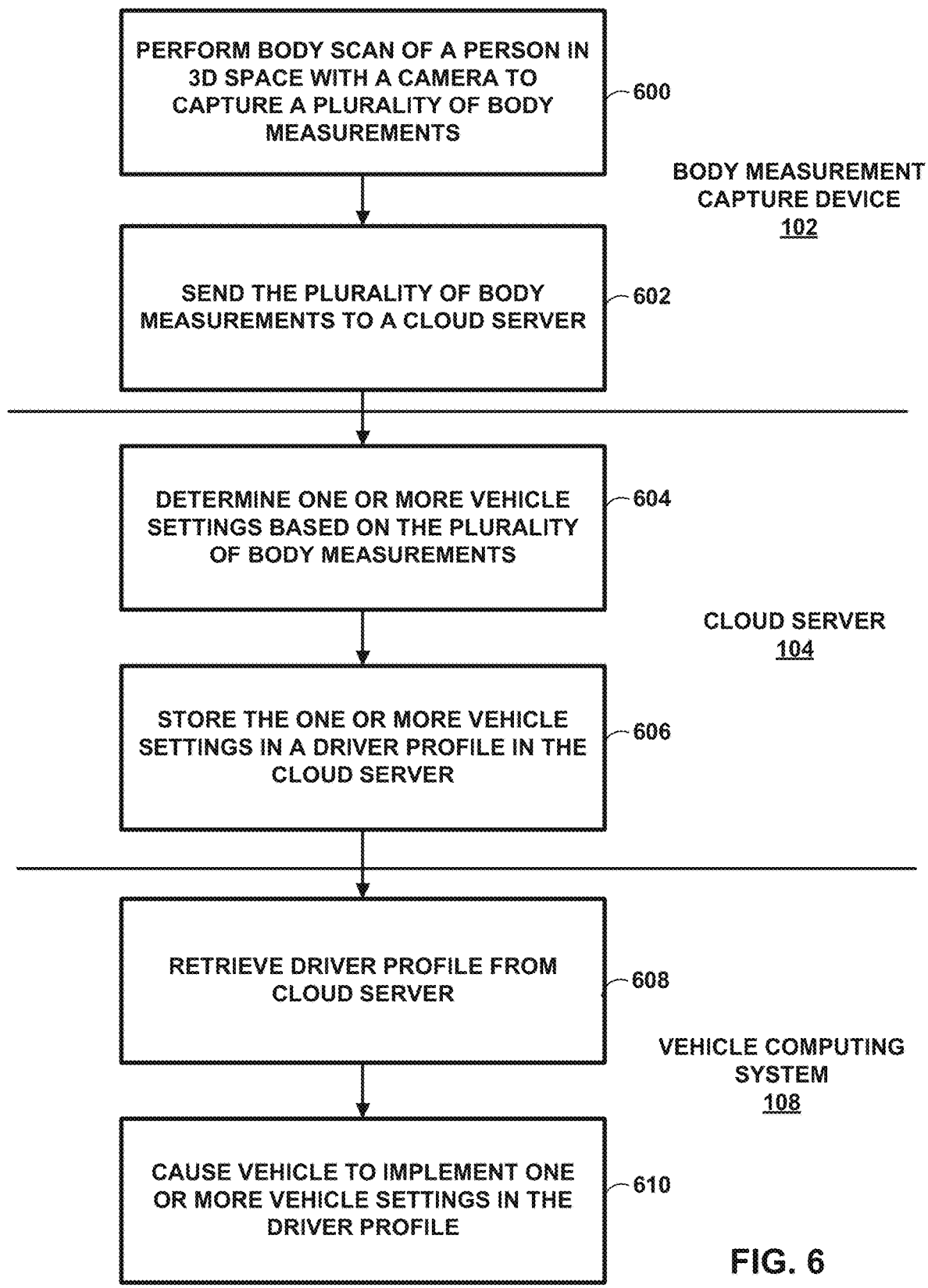
FIG. 6 is a flowchart illustrating example operation of the system shown in FIG. 1.

FIG. 6 is a flowchart illustrating example operation of the system shown in FIG. 1. The techniques of FIG. 6 may be performed by one or more structural components of body measurement capture device 102, cloud server 104, and vehicle computing system 106.

In one example of the disclosure, body measurement capture device 102 may be configured to perform a body scan of a person in 3D space with a camera to capture a plurality of body measurements (600). Body measurement capture device 102 may send the plurality of body measurements to cloud server 104 (602).

Cloud server 104 may determine one or more vehicle settings based on the plurality of body measurements (604). Cloud server 104 may then store the one or more vehicle setting in a driver profile store in cloud server 104 (606). In one example of the disclosure, cloud server 104 may be configured to determine multiple configurations of the one or more vehicle settings of the vehicle based on the plurality of body measurements, and store the multiple configurations of the one or more vehicle settings in the driver profile in a memory.

In one example, the one or more vehicle settings include one or more of a position of a heads-up display, a position of a pedal, an angle of a backrest, a height of a seat cushion, a tilt of the seat cushion, an extension position of the seat cushion, a position of a lumbar support, a position of a seat side bolster, a position of a headrest, a position of a side mirror, a position of a rear-view mirror, a tilt of a steering wheel, and/or a position of a steering wheel.

In another example, to determine the one or more vehicle settings of the vehicle based on the plurality of body measurements, cloud server 104 is further configured to determine a line-of-sight of the person based on the plurality of body measurements, and determine one or more of the position of the side mirror, the position of the rear-view mirror, or the position of the heads-up display based on the line-of-sight.

In another example, to determine the one or more vehicle settings of the vehicle based on the plurality of body measurements, cloud server 104 is further configured to determine the height of the seat cushion based on the plurality of body measurements such that the person has an unobstructed view to displays on an instrument panel of the vehicle.

Vehicle computing system 108 may retrieve the driver profile from cloud server 104 (608). Vehicle computing system 108 may then cause a vehicle (e.g., vehicle 106) to implement one or more vehicle settings in the driver profile (610).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to determine vehicle settings, the apparatus comprising:
   an interface configured to communicate with a device including a camera to obtain a plurality of body measurements of a person, wherein the plurality of body measurements was captured using the camera; and
   one or more processors configured to:
      determine one or more vehicle settings of a vehicle based on the plurality of body measurements, wherein to determine the one or more vehicle settings, the one or more processors are configured to:
         determine settings for a seat cushion and a pedal of the vehicle such that a knee of the person is bent when the person fully depresses the pedal while sitting on the seat cushion;
         determine settings for the seat cushion and a steering wheel such that shoulder contact is maintained with a seat backrest when the steering wheel is turned:
      and cause the vehicle to implement the one or more vehicle settings.

2. The apparatus of claim 1, wherein the one or more processors are further configured to:
   store the one or more vehicle settings in a profile in a memory.

3. The apparatus of claim 2, wherein the one or more processors are further configured to:
   determine multiple configurations of the one or more vehicle settings of the vehicle based on the plurality of body measurements; and
   store the multiple configurations of the one or more vehicle settings in the profile in the memory.

4. The apparatus of claim 1, wherein the one or more vehicle settings further include one or more of a position of a heads-up display, a position of the pedal, an angle of the backrest, a height of the seat cushion, a tilt of the seat cushion, an extension position of the seat cushion, a position of a lumbar support, a position of a seat side bolster, a position of a headrest, a position of a side mirror, a position of a rear-view mirror, a tilt of the steering wheel, or a position of the steering wheel.

5. The apparatus of claim 4, wherein to determine the one or more vehicle settings of the vehicle based on the plurality of body measurements, the one or more processors are further configured to:
   determine a line-of-sight of the person based on the plurality of body measurements; and
   determine one or more of the position of the side mirror, the position of the rear-view mirror, or the position of the heads-up display based on the line-of-sight.

6. The apparatus of claim 4, wherein to determine the one or more vehicle settings of the vehicle based on the plurality of body measurements, the one or more processors are further configured to:
   determine the height of the seat cushion based on the plurality of body measurements such that the person has an unobstructed view to displays on an instrument panel of the vehicle.

7. The apparatus of claim 4, wherein to determine the one or more vehicle settings of the vehicle based on the plurality of body measurements, the one or more processors are further configured to:
   determine the height of the angle of the backrest based on the plurality of body measurements such that the person can reach the steering wheel with bent elbows.

8. The apparatus of claim 4, wherein to determine the one or more vehicle settings of the vehicle based on the plurality of body measurements, the one or more processors are further configured to:
   determine the extension position of the seat cushion such that there is a clearance between a seat edge and a hollow of the knee of the person.

9. The apparatus of claim 1, wherein the one or more processors are part of a mobile phone that includes the camera, and wherein the camera is configured to perform a body scan of the person in a 3D space to capture the plurality of body measurements.

10. The apparatus of claim 1, wherein the one or more processors are further configured to determine a recommendation for a particular vehicle from a plurality of vehicles based on the body measurements of the person.

11. The apparatus of claim 1, wherein the one or more processors are further configured to:
   determine a first set of vehicle settings of the one or more vehicle settings for a front seat of the vehicle;
   determine a second set of vehicle settings of the one or more vehicle settings for a passenger seat of the vehicle;
   determine at least a third set of vehicle settings of the one or more vehicle settings for at least one rear seat of the vehicle, wherein the first set, the second set, and the third set include different settings from one another; and
   cause the vehicle to implement the first set, the second set, and third set of vehicle settings.

12. A method for determining vehicle settings, the method comprising:
   obtaining, from a device including a camera, a plurality of body measurements of a person, wherein the plurality of body measurements was captured using the camera;
   determining one or more vehicle settings of a vehicle based on the plurality of body measurements, wherein determining the one or more vehicle settings comprises:
      determining settings for a seat cushion and a pedal of the vehicle such that a knee of the person is bent when the person fully depresses the pedal while sitting on the seat cushion; and
      determine settings for the seat cushion and a steering wheel such that shoulder contact is maintained with a seat backrest when the steering wheel is turned; and
   causing the vehicle to implement the one or more vehicle settings.

13. The method of claim 12, further comprising:
   storing the one or more vehicle settings in a profile in a memory; and
   sending the profile to the vehicle.

14. The method of claim 12, wherein the one or more vehicle settings further include one or more of a position of a heads-up display, a position of the pedal, an angle of the backrest, a height of the seat cushion, a tilt of the seat cushion, an extension position of the seat cushion, a position of a lumbar support, a position of a seat side bolster, a position of a headrest, a position of a side mirror, a position of a rear-view mirror, a tilt of the steering wheel, or a position of the steering wheel.

15. The method of claim 14, wherein determining the one or more vehicle settings of the vehicle based on the plurality of body measurements comprises:
   determining a line-of-sight of the person based on the plurality of body measurements; and
   determining one or more of the position of the side mirror, the position of the rear-view mirror, or the position of the heads-up display based on the line-of-sight.

16. The method of claim 14, wherein determining the one or more vehicle settings of the vehicle based on the plurality of body measurements comprises:
   determining the height of the seat cushion based on the plurality of body measurements such that the person has an unobstructed view to displays on an instrument panel of the vehicle.

17. The method of claim 12, wherein the camera is configured to perform a body scan of the person in a 3D space to capture the plurality of body measurements.

18. A non-transitory computer-readable storage medium storing instructions that, when executed, cause at least one computer processor to:
   determine one or more vehicle settings of a vehicle based on a plurality of body measurements of a person captured using a camera, wherein to determine the one or more vehicle settings the instructions cause the at least one computer processor to:
      determine settings for a seat cushion and a pedal of the vehicle such that a knee of the person is bent when the person fully depresses the pedal while sitting in the seat;
      determine settings for the seat cushion and a steering wheel such that shoulder contact is maintained with a seat backrest when the steering wheel is turned; and
   implement the one or more vehicle settings in the vehicle.

19. The non-transitory computer-readable storage medium of claim 18, wherein the instructions, when executed, cause at least one computer processor to further:
   determine a recommendation for a particular vehicle from a plurality of vehicles based on the body measurements of the person.

20. The non-transitory computer-readable storage medium of claim 18, wherein the one or more vehicle settings further include one or more of a position of a heads-up display, a position of the pedal, an angle of the backrest, a height of the seat cushion, a tilt of the seat cushion, an extension position of the seat cushion, a position of a lumbar support, a position of a seat side bolster, a position of a headrest, a position of a side mirror, a position of a rear-view mirror, a tilt of the steering wheel, or a position of the steering wheel.

\* \* \* \* \*